United States Patent
Papenfuhs et al.

[11] 4,042,611
[45] Aug. 16, 1977

[54] WATER-IN-SOLUBLE DISAZO METHINE COMPOUNDS

[75] Inventors: Theodor Papenfuhs, Frankfurt am Main; Heinrich Volk, Bad Vilbel, both of Germany

[73] Assignee: Hoechst Aktiengesellschaft, Frankfurt am Main, Germany

[21] Appl. No.: 641,260

[22] Filed: Dec. 16, 1975

[30] Foreign Application Priority Data

Dec. 20, 1974 Germany .................... 2460490

[51] Int. Cl.$^2$ ............................................. C07F 15/02
[52] U.S. Cl. .................... 260/439 R; 8/1 C; 8/12; 8/24; 8/162 S; 8/180; 106/288 Q
[58] Field of Search ............. 260/429 C, 439 R, 438.1

[56] References Cited
U.S. PATENT DOCUMENTS

| | | | |
|---|---|---|---|
| 3,393,178 | 7/1968 | Lynch et al. | 260/429.9 X |
| 3,440,254 | 4/1969 | Lenoir et al. | 260/429 |
| 3,472,876 | 10/1969 | Klein | 260/439 R X |
| 3,687,991 | 8/1972 | Gaeng et al. | 260/429 C |
| 3,700,709 | 10/1972 | Inman et al. | 260/429 C X |
| 3,864,371 | 2/1975 | Inman et al. | 260/429 C X |
| 3,875,200 | 4/1975 | L'Eplattenier et al. | 260/429 C X |
| 3,891,685 | 6/1975 | Hari | 260/429 C X |
| 3,895,041 | 7/1975 | Inman et al. | 260/439 R X |

*Primary Examiner*—Helen M. S. Sneed
*Attorney, Agent, or Firm*—Connolly and Hutz

[57] ABSTRACT

New valuable metal complex disazomethine compounds of the formula

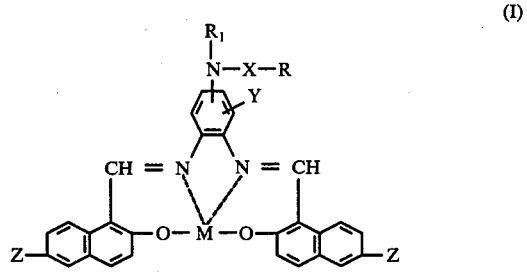

(I)

had been found wherein R is hydrogen, an alkyl, aralkyl, cycloalkyl, aryl or heterocyclic radical, an amino group which may be substituted by alkyl or aryl radicals, or a guanidino group, X stands for a -CO- or -SO$_2$- group, Y stands for hydrogen, a halogen atom, an alkyl, alkoxy or nitro group, R$_1$ stands for hydrogen or an alkyl radical, Z stands for hydrogen, a halogen atom, an alkoxy or nitro group and M is a bivalent metal atom.

The new compounds are very well suitable as dyes, especially good pigments, and can be used, for example for the dyeing of masses of synthetic materials, for pigmenting paints and lacquers, for spin-dyeing viscose and cellulose acetate and for pigmenting polyethylene or similar polymers, caoutchouc or synthetic leather.

Their dyeings have excellent fastnesses as, for example, to migration, light, weather and solvents.

Furthermore, the compounds themselves have an excellent heat stability, a high color intensity and high degree of purity of the shades.

8 Claims, No Drawings

WATER-IN-SOLUBLE DISAZO METHINE COMPOUNDS

The present invention relates to water-insoluble disazo methine compounds, a process for preparing them and their use as dyestuff.

The new compounds correspond to the general formula (I)

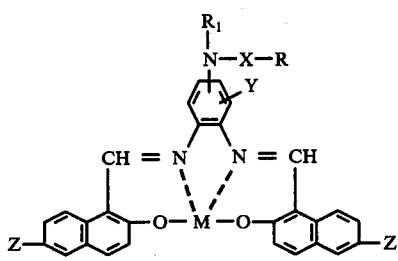

(I)

in which R stands for hydrogen, an alkyl, aralkyl, cycloalkyl, aryl or heterocyclic radical, an amino group which may be substituted by alkyl or aryl radicals, or a guanidino group, X stands for a -CO- or -$CO_2$-group, Y stands for hydrogen, a halogen atom, an alkyl, alkoxy or nitro group, $R_1$ stands for hydrogen or an alkyl radical, Z stands for hydrogen, a halogen atom, an alkoxy or nitro group and M is a bivalent metal atom.

Preferred compounds of the formula (I) are especially those in which R stands for an alkyl radical having 1 to 4 carbon atoms or an aryl radical, preferably the phenyl or naphthyl radical, optionally substituted by one or several, such as 1 to 4, preferably 1 or 2 substituents selected from halogen atoms, such as chlorine or bromine, nitro, lower alkyl, lower alkoxy or cyano groups and especially carbon amide groups, X stands for a -CO- or -$SO_2$-group, Y stands for hydrogen, a chlorine atom or a lower alkoxy or alkyl group of 1 to 3 carbon atoms, $R_1$ stands for hydrogen, Z stands for hydrogen, a bromine atom or a methoxy group and M is nickel. Especially interesting are dyestuffs of the formula I in which R stands for a methyl, phenyl, chlorophenyl, methoxyphenyl, amino, phenylamino or guanidino group, X stands for a -CO- or -$SO_2$-group, Y stands for hydrogen, a methyl or methoxy group, $R_1$ stands for hydrogen or a methyl group, Z stands for hydrogen and M is nickel.

The new compounds can be obtained according to the invention by condensing 2 mols of an aldehyde of the formula (II)

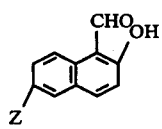

(II)

in which Z is defined as above, with 1 mol of a diamine of the formula (III)

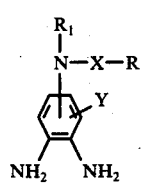

(III)

in which R, $R_1$, X and Y are defined as above and metallizing the disazo methine compound so obtained simultaneously or subsequently. If desired, mixtures of compounds of the formula (II) or (III) can be used in the condensation reaction.

The compounds of the formula (I) can also be obtained by reducing the o-nitranilines of the general formula (IV)

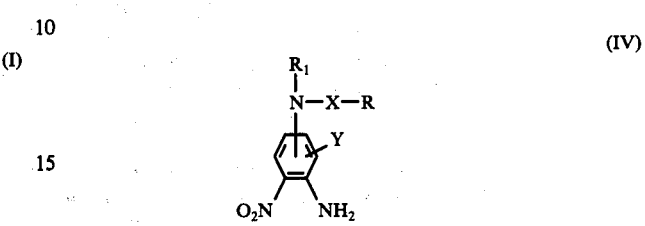

(IV)

in which R, $R_1$, X and Y are defined as above, according to usual methods, reacting the o-phenylene diamines so obtained without intermediate isolation with 2-hydroxy-1-naphthaldehyde, and then metallizing the diazomethines synthetized.

Suitable aldehydes of the formula (II) are especially those in which Z stands for a hydrogen atom, a chlorine or bromine atom, a methoxy, ethoxy or propoxy group, or a nitro group. They can be obtained in known manner by formylating the corresponding 2-hydroxynaphthalenes, for example according to the method of Duff.

Suitable diamines of the formula (III) are especially those in which R stands for hydrogen, an alkyl radical of 1 to 12, preferably 1 to 4 carbon atoms, a benzyl or phenethyl radical, a cyclohexyl radical, a phenyl radical which may be substituted by 1 to 3 substituents selected from chlorine atoms, methyl, methoxy, ethoxy, nitro, trifluoromethyl, carbalkoxy or aryl ester groups, carbamoyl, carboxylic acid aryl amide, acetylamine, benzoylamino, sulfamoyl, sulfonic acid alkyl amide or sulfonic acid phenyl amide groups, or is a naphthyl radical, a pyridine or quinoline radical, an amino, methyl amino, dimethyl amino, dimethyl carbonamide or phenyl amino groups, Y stands for hydrogen, a chlorine atom, a lower alkyl, lower alkoxy or nitro group and $R_1$ stands for hydrogen, a methyl or ethyl radical.

The condensation of the aldehyde with the diamine is advantageously carried out in water or in an organic solvent at an elevated temperature, preferably between about 60° C and the boiling point of the solvent used. Suitable solvents are water, ethanol, glacial acetic acid, dimethyl formamide, N-methylpyrrolidone, glycol monomethyl ether, xylene, or mixtures thereof.

The disazo methine compounds so obtained are sparingly soluble in the solvents mentioned and can, therefore, easily be isolated by filtration. Impurities can be eliminated by washing them out.

To transform the disazo methine compounds into their metal complex compounds, they are treated with agents which yield bivalent metals, for example with salts of copper, but especially of nickel. The formiates or acetates of these metals are preferably used.

The metallization is advantageously carried out in one of the above-mentioned solvents or in a mixture of these solvents.

The metallization can also be carried out simultaneously as the condensation by condensing the aldehyde together with the diamine in one of the above-mentioned solvents or in a mixture thereof in the presence of metal salts.

The new compounds turned out to be very good dyeing matters and are especially good pigments which are, especially after a conditioning (finish) usual for pigment dyestuffs, suitable for example for dyeing masses of synthetic materials, which are meant to be masses of synthetic materials or synthetic resins free of or containing solvents, free of or containing plasticizers, moreover for pigmenting paints on oily or aqueous basis as well as lacquers of most various types, for spin dyeing viscose and cellulose acetate or for pigmenting polyethylene, polystyrene, polyvinyl chloride, caoutchouc or synthetic leather.

They can also be used in printing pastes for the graphic arts, for the paper mass dyeing, for coating textile materials or for pigment printing. The dyeings obtained hyve an excellent fastness to migration, light, weather and solvents, have an excellent heat stability and are distinguished by a high color intensity, a good transparency and, frequently, a high degree of purity of the shades.

Compared to structurally comparable dyestuffs having pigment properties the compounds of the invention are distinguished by a higher color intensity and a higher degree of purity of the shade, but especially by a superior fastness to light and to weather.

The following Examples serve to illustrate the invention.

EXAMPLE 1

A mixture of 8.25 g of 1-acetylamino-3,4-diaminobenzene, 17.2 g of 2-hydroxy-1-naphthaldehyde and 400 ml of ethanol were heated, while boiling, during 4 hours. After cooling to 60° C the precipitate was suction-filtered and washed with ethanol.

The moist residue was suspended in 300 ml of ethanol, 9 g of nickel acetate were added thereto and the suspension was heated at boiling during 4 hours. The precipitate was suction-filtered while hot, readily washed with hot water and ethanol and dried at 60° C. 24.9 g (= 94.0 % of the theory) of a red compound of the formula

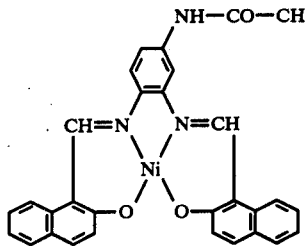

were obtained which showed very good pigment properties and yielded in polyvinyl chloride or in lacquers red dyeings having a higher color intensity and a good fastness to light and to weather.

EXAMPLES 2 to 9

When instead of the 3,4-diamino-1-acetylamino-benzene used in Example 1 the diamines indicated in Table 1 are used, nickel-complex compounds according to the invention are also obtained which have good pigment properties and yield in polyvinyl chloride or in lacquers dyeings of high color intensity and good fastness to light and to weather in the shades indicated in the following Table 1.

TABLE 1

| Example | Diamine | Shade of the Pigment |
|---|---|---|
| 2 | (structure with SO₂—phenyl, NH, H₂N, NH₂) | red |
| 3 | (structure with CH₃O, NH—SO₂—phenyl, NH₂, NH₂) | bluish-red |
| 4 | (structure with NH—CO—NH—phenyl, H₂N, NH₂) | red |
| 5 | (structure with NH—CO—phenyl—OCH₃, H₂N, NH₂) | red |
| 6 | (structure with NH—CO—phenyl—Cl, H₂N, NH₂) | red |
| 7 | (structure with N(CH₃)—CO—phenyl, H₂N, NH₂) | red |
| 8 | (structure with NH—CO NH—C(=NH)—NH₂, H₂N, NH₂) | red |
| 9 | (structure with NH—CO—NH₂, NH₂, NH₂) | red |

EXAMPLE 10

A mixture of 17.2 g of 2-hydroxy-1-naphtaldehyde, 9 g of nickel-(II)-acetate, 300 ml of ethanol and 100 ml of glacial acetic acid was stirred for 1 hour at room temperature. 11.35 g of 1-benzoylamino-3,4-diamino-benzene were added to this solution and the whole was heated at boiling for 4 hours. The precipitate formed was suction-filtered while hot, it was washed with hot water and ethanol and dried at 60° C.

28.1 g (= 96.5 % of the theory) of a red compound of the formula

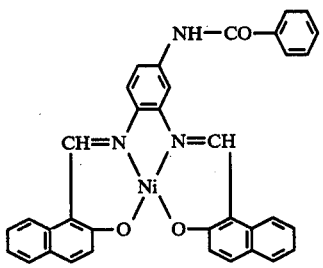

were obtained which showed good pigment properties and yielded in polyvinyl chloride or in lacquers red dyeings having a high color intensity and a good fastness to light and to weather.

EXAMPLE 11

When instead of 1-benzoylamino-3,4-diaminobenzene the corresponding amount of a-phenylsulfonylamino-3,4-diaminobenzene was used, and dimethyl-formamide as solvent, 32.8 g (= 96.2 % of the theory) of a red compound of the formula

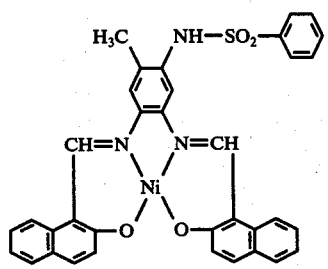

were obtained which had pigment properties and very good fastness to light and to weather and a high color intensity.

EXAMPLE 12

To a mixture of 17.2 g of 2-hydroxy-1-naphthaldehye, 200 ml of ethanol and 100 ml of glacial acetic acid 9 g of nickel acetate were added, and the mixture was stirred for 1 hour at room temperature. 6.15 g of 1,2,4-triaminobenzene were added, and the mixture was heated at 75° – 80° C for 2 hours. The red precipitate was suction-filtered, washed with hot water and ethanol and sharply suctioned dry. The compound of the formula

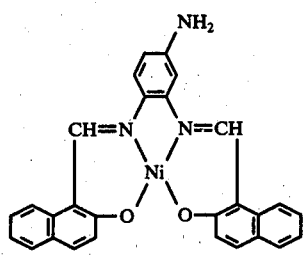

obtained was suspended in 200 ml of toluene and the residual water was separated by an azeotropic distillation. It was cooled, 5 g of triethyl amine were added and to that mixture 7.5 g of benzoyl chloride were added while stirring thoroughly. Then, the mixture was heated at 60° – 70° C for 1 hour. The precipitate was suction-filtered, readily washed with water and ethanol and dried at 60° C. 26.3 g (= 90.4 % of the theory) of a compound were obtained which is identical with the compound obtained according to the operational method described in Example 10 and had the same good pigment properties.

EXAMPLE 13

12.85 g of 3-nitro-4-amino-1-benzoylamino benzene were hydrogenated in 200 ml of ethanol with Raney-nickel. After the absorption of the theoretical amount of hydrogen the mixture was heated to the boiling point, the solution was filtered off, while hot, from the catalyst and the catalyst was washed with 100 ml of hot glacial acetic acid. The combined filtrates were added to a solution of 172 g of 2-hydroxy-1-naphthaldehyde in 100 ml of glacial acetic acid and heated, while boiling, for 3 hours. The solution was suction-filtered at 60° C and the filter cake was washed with glacial acetic acid and hot ethanol. Metallization is carried out as indicated in Example 1; 27.2 g of a red compound were obtained which was identical with the compound described in Example 10 and had the same good pigment properties.

What is claimed is:

1. Compounds of the general formula

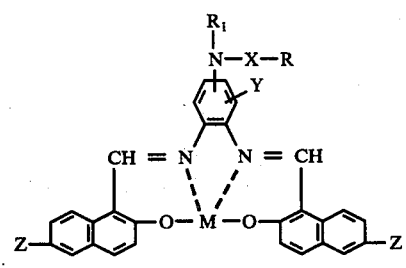

wherein R is hydrogen, an alkyl, aralkyl, cycloalkyl, aryl, an amino group which may be substituted by alkyl or aryl radicals, or a guanidino group, X is a -CO- or -SO$_2$-group, Y is hydrogen, a halogen atom, an alkyl, alkoxy or nitro group, R$_1$ is hydrogen or an alkyl radical, Z is hydrogen, a halogen atom, an alkoxy, nitro or cyano group and M is nickel or copper.

2. Compounds as claimed in claim 1, wherein R is an alkyl radical having 1 to 4 carbon atoms or a phenyl or naphthyl radical each optionally substituted by halogen atoms, nitro, lower alkyl, lower alkoxy or cyano groups and carbon amide groups, X is a -CO- or -SO$_2$-group, Y is a hydrogen atom, a chlorine atom or a lower alkoxy or alkyl group of 1 to 3 carbon atoms, R$_1$ is hydrogen, Z is hydrogen, a bromine atom or a methoxy group and M is nickel.

3. Compounds as claimed in claim 1, wherein R is a methyl, phenyl, chlorophenyl, methoxyphenyl, amino, phenylamino or guanidino group, X is a -CO- or -SO$_2$-group, Y is hydrogen, a methyl or methoxy group, R$_1$ is hydrogen or a methyl group, Z is hydrogen and M is a nickel atom.

4. The compound as claimed in claim 1 of the formula

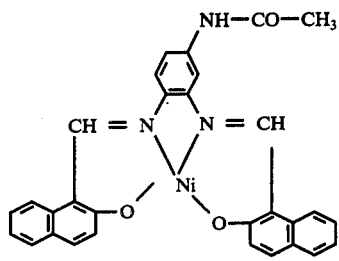
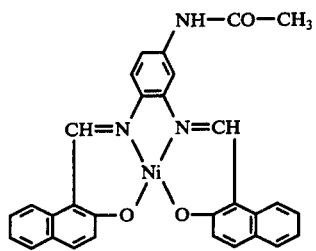
5. The compound as claimed in claim 1 of the formula
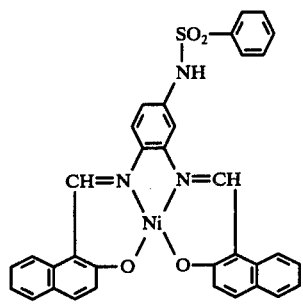
6. The compound as claimed in claim 1 of the formula
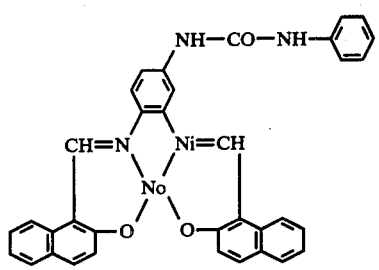
7. The compound as claimed in claim 1 of the formula
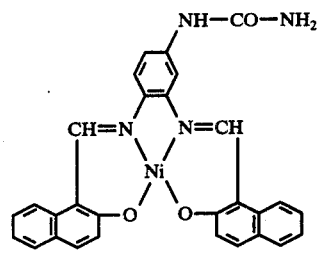
8. The compound as claimed in claim 1 of the formula
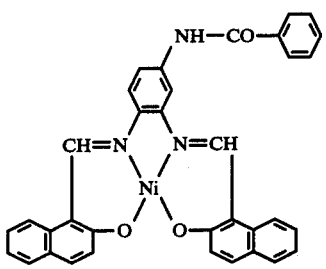
* * * * *